US010622666B2

(12) United States Patent
Wachsman et al.

(10) Patent No.: US 10,622,666 B2
(45) Date of Patent: Apr. 14, 2020

(54) ION CONDUCTING BATTERIES WITH SOLID STATE ELECTROLYTE MATERIALS

(71) Applicant: University of Maryland, College Park, College Park, MD (US)

(72) Inventors: Eric D. Wachsman, Fulton, MD (US); Liangbing Hu, Hyattsville, MD (US); Venkataraman Thangadurai, Calgary (CA)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 213 days.

(21) Appl. No.: 14/222,306

(22) Filed: Mar. 21, 2014

(65) Prior Publication Data
US 2014/0287305 A1 Sep. 25, 2014

Related U.S. Application Data

(60) Provisional application No. 61/803,981, filed on Mar. 21, 2013.

(51) Int. Cl.
*H01M 4/36* (2006.01)
*H01M 10/052* (2010.01)
(Continued)

(52) U.S. Cl.
CPC ....... *H01M 10/052* (2013.01); *H01M 10/054* (2013.01); *H01M 10/0562* (2013.01);
(Continued)

(58) Field of Classification Search
CPC .......... H01M 10/052; H01M 10/0562; H01M 10/054; H01M 4/661; H01M 2300/0071;
(Continued)

(56) References Cited

U.S. PATENT DOCUMENTS 6,447,712 B1 9/2002 Dogan
8,304,115 B1 11/2012 Petkov et al.
(Continued)

FOREIGN PATENT DOCUMENTS

EP 2099087 A1 9/2009
JP 2000100471 A 4/2000
(Continued)

OTHER PUBLICATIONS

"Disodium Terephthalate (Na2C8H4O4) as High Performance Anode Material for Low-Cost Room Temperature Sodium-Ion Battery" by Liang Zhao et al. in Advanced Energy Materials, 2012, vol. 2, Issue 8, p. 962-965, published Aug. 2012. PDF file.*
(Continued)

*Primary Examiner* — Jonathan G Jelsma
*Assistant Examiner* — Omar M Kekia
(74) *Attorney, Agent, or Firm* — Ladas & Parry, LLP

(57) ABSTRACT

Solid-state, ion-conducting batteries with an ion-conducting, solid-state electrolyte. The solid-state electrolyte has at least one porous region (e.g., porous layer) and a dense region (e.g., dense layer). The batteries are, for example, lithium-ion, sodium-ion, or magnesium-ion conducting solid-state batteries. The ion-conducting, solid-state electrolyte is, for example, a lithium-garnet material.

25 Claims, 9 Drawing Sheets

(51) Int. Cl.
*H01M 10/0562* (2010.01)
*H01M 10/054* (2010.01)
*H01M 4/66* (2006.01)
*H01M 4/04* (2006.01)

(52) U.S. Cl.
CPC ........ *H01M 4/0407* (2013.01); *H01M 4/0414* (2013.01); *H01M 4/661* (2013.01); *H01M 2300/0071* (2013.01); *Y02E 60/122* (2013.01)

(58) Field of Classification Search
CPC .. H01M 4/0407; H01M 4/0414; Y02E 60/122
USPC .......................... 429/211, 188, 304, 321, 322
See application file for complete search history.

(56) References Cited

U.S. PATENT DOCUMENTS

| | | | |
|---|---|---|---|
| 2003/0190520 A1* | 10/2003 | Amine | H01M 2/0245 429/149 |
| 2007/0148553 A1* | 6/2007 | Weppner | C01G 33/006 429/322 |
| 2008/0182147 A1 | 7/2008 | Blake et al. | |
| 2008/0241665 A1 | 10/2008 | Sano | |
| 2009/0226790 A1 | 9/2009 | Kanamura | |
| 2009/0226816 A1* | 9/2009 | Yoshida | H01M 4/13 429/304 |
| 2010/0331170 A1 | 12/2010 | Balagopal | |
| 2011/0149473 A1 | 6/2011 | Eilertsen et al. | |
| 2011/0244337 A1 | 10/2011 | Ohta | |
| 2012/0199785 A1* | 8/2012 | Saka | C01B 25/45 252/182.1 |
| 2013/0004830 A1* | 1/2013 | Song | H01M 10/054 429/163 |
| 2015/0056520 A1 | 2/2015 | Thokchom | |
| 2015/0111110 A1 | 4/2015 | Watanabe | |
| 2017/0022112 A1 | 1/2017 | Karpenko | |

FOREIGN PATENT DOCUMENTS

| | | |
|---|---|---|
| JP | 2009238739 | 10/2009 |
| JP | 2010015782 A | 1/2010 |
| JP | 2010202499 A | 9/2010 |
| JP | 2013008671 A | 1/2013 |
| JP | 2013232284 A | 11/2013 |
| WO | 2008059987 A1 | 5/2008 |
| WO | 2009108184 A1 | 9/2009 |

OTHER PUBLICATIONS

Official Communication from EPO Patent Application No. 14770567.7 dated Aug. 12, 2019.
Official Communication from EPO Patent Application No. 14770567.7 dated Apr. 20, 2018.
Extended Search Report and Opinion from EPO Patent Application No. 14770567.7 dated Sep. 26, 2016.
Office action from Japanese Patent Application No. 2016-504384 dated Feb. 13, 2019, and its English translation.
Office action from Japanese Patent Application No. 2016-504384 dated Mar. 28, 2019, and its English translation.
PCT International Preliminary Report on Patentability (Chapter I) with Written Opinion from PCT/US2014/031492 dated Sep. 22, 2015.
PCT International Search Report and Written Opinion from PCT/US2014/031492 dated Aug. 11, 2014.
Osamu Yamamoto, "Solid oxide fuel cells: fundamental aspects and prospects," Electrochimica Acta 45 (2000), 2423-2435.
Extract from Sigma Aldrich website, (https://www.sigmaaldrich.com/catalog/product/sial/s4126?lang=en&region=GB), downloaded Aug. 5, 2019.
Abstract from Murugan, R.Thangadurai, V., and Weppner, W . (2007), Fast Lithium Ion Conduction in Garnet-Type $Li_7La_3Zr_2O_{12}$. Angewandte Chemie, International Edition, 46: 7778-7781 presented in EPO opposition related to EP Patent No. 2976798.
Murugan, R.Thangadurai, V., and Weppner, W.. (2007), Fast Lithium Ion Conduction in Garnet-Type $Li_7La_3Zr_2O_{12}$. Angewandte Chemie, International Edition, 46: 7778-7781.
Marked-up version of Figure 4 of U.S. Pat. No. 8,304,115 B1 presented in EPO opposition related to EP Patent No. 2976798.
Applicant's reply to EPO communication from the Examining Division dated Jan. 3, 2018 for EP Patent No. 2976798.
Hanc, et al., "On fabrication procedures of Li-ion conducting garnets," Journal of Solid State Chemistry 248, Jan. 2017, pp. 51-60.
Hitz, et al., "High-rate lithium cycling in a scalable trilayer Li-garnet-electrolyte architecture," Materials Today, vol. 22, Jan./Feb. 2019 (28 pages).
Hitz, et al., "High-rate lithium cycling in a scalable trilayer Li-garnet-electrolyte architecture," Materials Today, vol. 22, Jan./Feb. 2019, pp. 50-57.
Hotza, et al., "Tape casting of preceramic polymers toward advanced ceramics: A review," International Journal of Ceramic Engineering and Science, 2019, 1:21-41.
Jonson, et al., "Tape casting and sintering of $Li_7La_3Zr_{1.75}Nb_{0.25}Al_{0.1}O_{12}$ with $Li_3BO_3$ additions," Solid State Ionics, vol. 323, Oct. 1, 2018, pp. 49-55.
Liu, et al., "Multilayer Composite Solid Electrolytes for Lithium Ion Batteries," Syracuse University, Dissertations—All, Surface, May 2016 (172 pages).
Schnell, et al., "All-solid-state lithium-ion and lithium metal batteries—paving the way to large-scale production," Journal of Power Sources, vol. 382 (2018), pp. 160-175.

* cited by examiner (a)
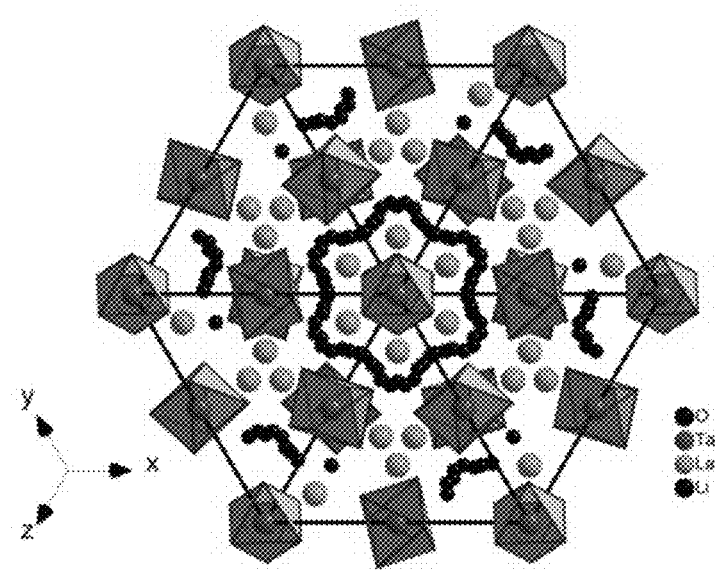
(b)
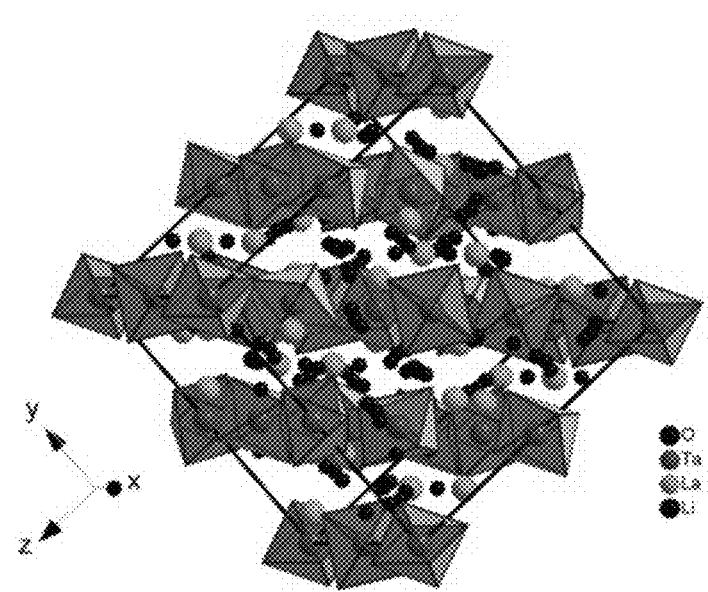
Figures 2(a)-(b)

(a)
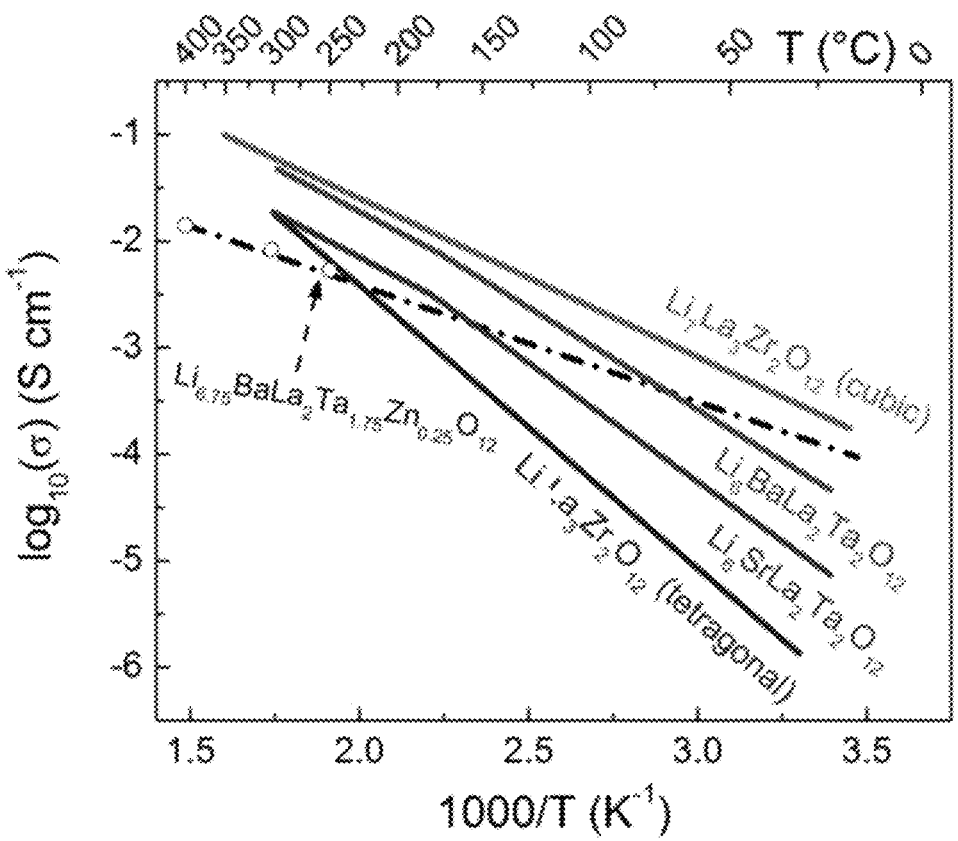
(b)
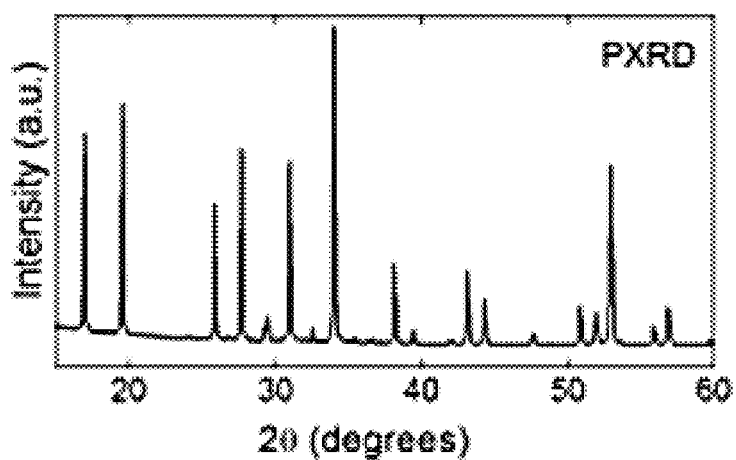
Figures 4(a)-(b)

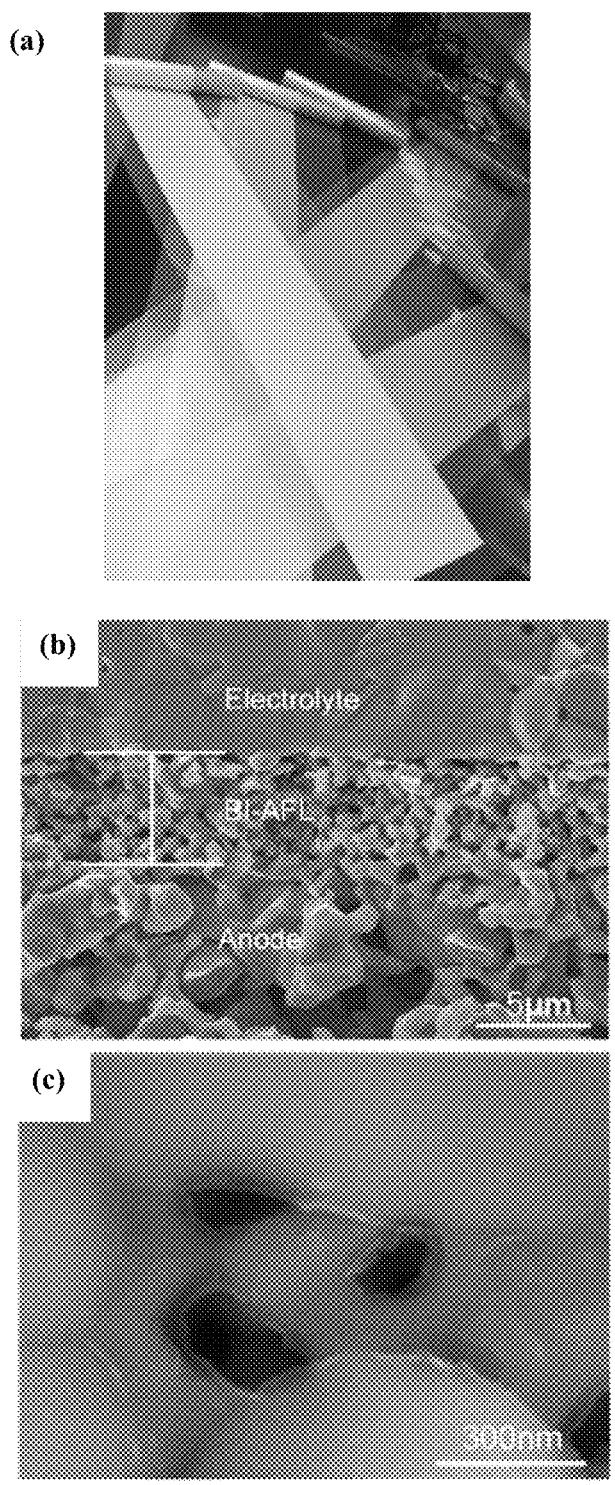
Figures 7(a)-(c)

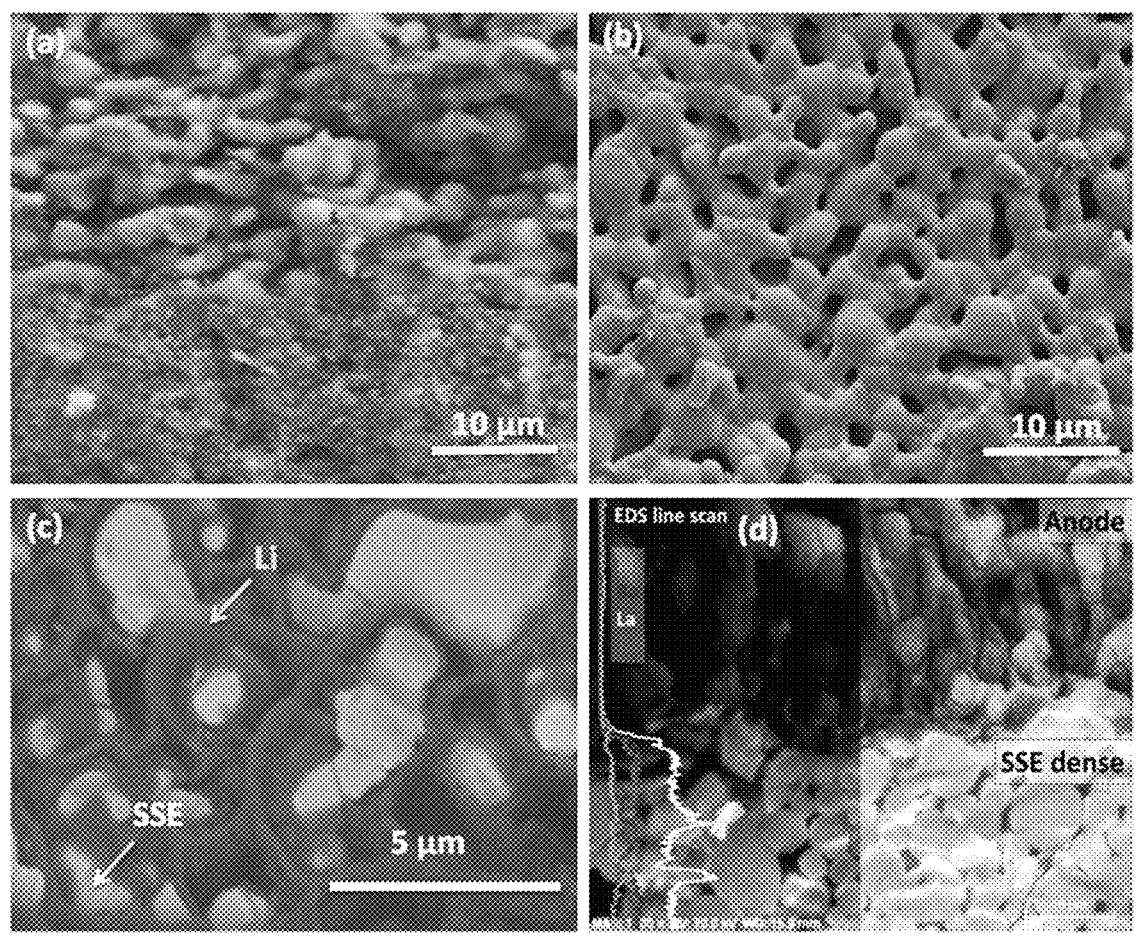
Figure 8(a)-(d)

ION CONDUCTING BATTERIES WITH SOLID STATE ELECTROLYTE MATERIALS

CROSS-REFERENCE TO RELATED APPLICATIONS

This application claims priority to U.S. provisional patent application No. 61/803,981, filed Mar. 21, 2013, the disclosure of which is incorporated herein by reference.

FIELD OF THE DISCLOSURE

The present disclosure generally relates to ion conducting batteries with solid-state electrolytes.

BACKGROUND OF THE DISCLOSURE

Lithium ion batteries (LiBs) have the highest volumetric and gravimetric energy densities compared to all other rechargeable batteries making LiBs the prime candidate for a wide range of applications, from portable electronics to electric vehicles (EVs). Current LiBs are based mainly on $LiCoO_2$ or $LiFePO_4$ type positive electrodes, a $Li^+$ conducting organic electrolyte (e.g., $LiPF_6$ dissolved in ethylene carbonate-diethyl carbonate), and a Li metal or graphitic anode. Unfortunately, there are several technological problems that exist with current state-of-the art LiBs: safety due to combustible organic components; degradation due to the formation of reaction products at the anode and cathode electrolyte, interfaces (solid electrolyte interphase—SEI); and power/energy density limitations by poor electrochemical stability of the organic electrolyte. Other batteries based sodium, magnesium, and other ion conducting electrolytes have similar issues.

BRIEF SUMMARY OF THE DISCLOSURE

A solid-state, ion-conducting battery comprising: (a) cathode material or anode material; (b) a solid-state electrolyte (SSE) material comprising a porous region having a plurality of pores, and a dense region, where the cathode material or the anode material is disposed on at least a portion of the porous region and the dense region is free of the cathode material and the anode material, and a current collector disposed on at least a portion of the cathode material or the anode material.

In an embodiment, the SSE material comprises two of the porous regions, the battery comprises the cathode material and the anode material, and the cathode material is disposed on at least a portion of one of the porous regions forming a cathode-side porous region and the anode material is disposed on at least a portion of the other porous region forming an anode-side porous region, and the cathode-side region and the anode-side region are disposed on opposite sides of the dense region, and further comprises a cathode-side current collector and an anode-side current collector.

In an embodiment, the cathode material is a lithium-containing material, a sodium-containing cathode material, or a magnesium-containing cathode material. In an embodiment, the cathode material comprises a conducting carbon material, and the cathode material, optionally, further comprises an organic or gel ion-conducting electrolyte. In an embodiment, the lithium-containing electrode material is a lithium-containing, ion-conducting cathode material selected from $LiCoO_2$, $LiFePO_4$, $Li_2MMn_3O_8$, wherein M is selected from Fe, Co, and combinations thereof. In an embodiment, the sodium-containing cathode material is a sodium-containing, ion-conducting cathode material is selected from $Na_2V_2O_5$, $P2-Na_{2/3}Fe_{1/2}Mn_{1/2}O_2$, $Na_3V_2(PO_4)_3$, $NaMn_{1/3}CO_{1/3}Ni_{1/3}PO_4$, and $Na_{2/3}Fe_{1/2}Mn_{1/2}O_2$@graphene composite. In an embodiment, the magnesium-containing cathode material is a magnesium-containing, ion-conducting cathode material and is a doped manganese oxide.

In an embodiment, the anode material is a lithium-containing anode material, a sodium-containing anode material, or a magnesium-containing anode material. In an embodiment, the lithium-containing anode material is lithium metal. In an embodiment, the sodium-containing anode material is sodium metal or an ion-conducting, sodium-containing anode material selected from $Na_2C_8H_4O_4$ and $Na_{0.66}Li_{0.22}Ti_{0.78}O_2$. In an embodiment, the magnesium-containing anode material is magnesium metal.

In an embodiment, the SSE material is a lithium-containing SSE material, a sodium-containing SSE material, or a magnesium-containing SSE material. In an embodiment, the lithium-containing SSE material is a Li-garnet SSE material. In an embodiment, the Li-garnet SSE material is cation-doped $Li_5La_3M^1{}_2O_{12}$, where $M^1$ is Nb, Zr, Ta, or combinations thereof, cation-doped $Li_6La_2BaTa_2O_{12}$, cation-doped $Li_7La_3Zr_2O_{12}$, and cation-doped $Li_6BaY_2M^1{}_2O_{12}$, where cation dopants are barium, yttrium, zinc, or combinations thereof. In an embodiment, the Li-garnet SSE material is $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

In an embodiment, the current collector is a conducting metal or metal alloy.

In an embodiment, the dense region of the SSE material has a dimension of 1 µm to 100 µm and/or the porous region of the SSE material that has the cathode material disposed thereon has a dimension of 20 µm to 200 µm and/or the porous region of the SSE material that has the anode material disposed thereon has a dimension of 20 µm to 200 µm.

In an embodiment, the ion-conducting cathode material, the ion-conducting anode material, the SSE material, and the current collector form a cell, and the solid-state, ion-conducting battery comprises a plurality of the cells, each adjacent pair of the cells is separated by a bipolar plate.

A solid-state, ion-conducting battery comprising a solid-state electrolyte (SSE) material comprising a porous region of electrolyte material disposed on a dense region of electrolyte material, the SSE material configured such that ions diffuse into and out of the porous region of the SSE material during charging and/or discharging of the battery. In an embodiment, the SSE material comprises two porous regions disposed on opposite sides of the dense region of the SSE material.

BRIEF DESCRIPTION OF THE FIGURES

The following figures are given by way of illustration only, and thus are not intended to limit the scope of the present disclosure.

$Li_7La_3Zr_2O_{12}$, (8) $Li_{6.5}La_{2.5}Ba_{0.5}TaZrO_{12}$ (sintered at 900° C.), and (9) $Li_{6.5}La_{2.5}Ba_{0.5}TaZrO_{12}$ (sintered at 1100° C.).

Figure 2C:
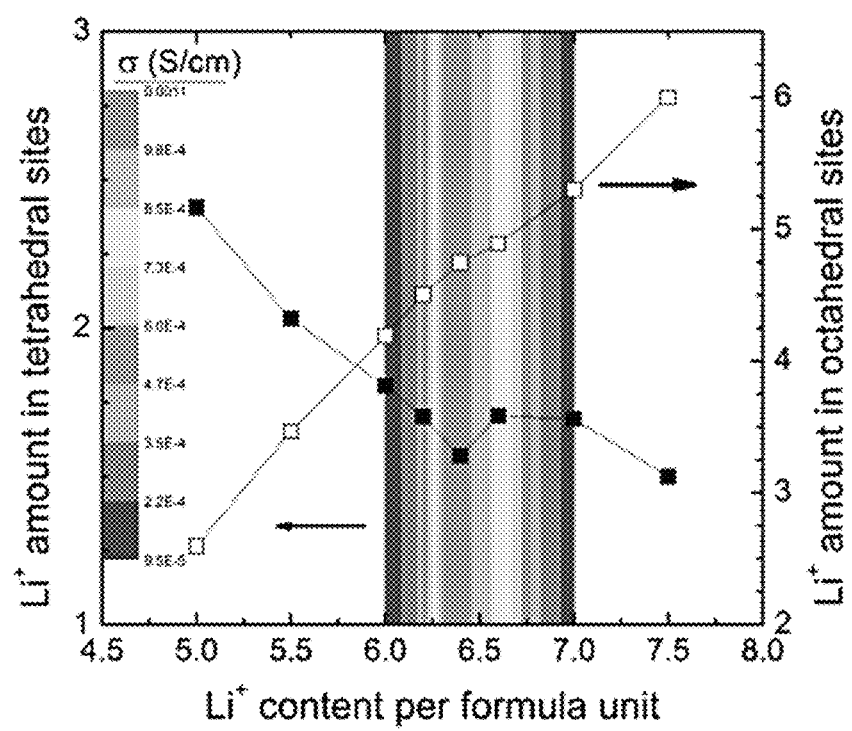

FIG. 2. Example of optimization of Li ion conduction in garnet-type solid-state electrolytes (SSEs): (a) and (b) path of $Li^+$ conduction and (c) effect of $Li^+$ site occupancy on conductivity.

Figure 3:
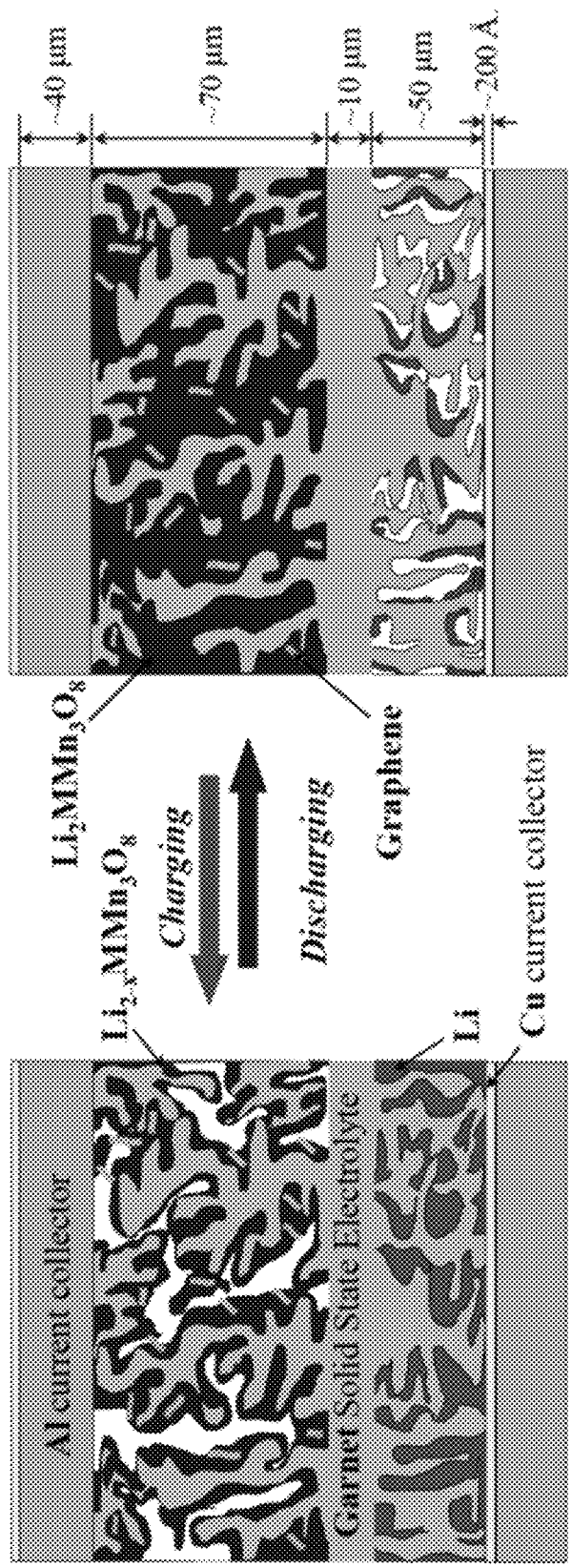

FIG. 3. Schematic of an example of the solid-state lithium battery (SSLiB) showing thin (~10 μm) garnet SSE layer extending as a tailored nano/microstructured scaffold into (Li metal filled) anode and ($Li_2MMn_3O_8$, M=Fe, Co, mixed with graphene) cathode to provide structural support for solid-state electrolyte (SSE) layer, and high surface area and continuous ion transport path for reduced polarization. The multi-purpose ~40 μm Al current collector (with ~200 Å Cu on anode side) provides strength and thermal and electrical conduction. The ~170 μm repeat units are stacked in series to provide desired battery pack voltage and strength (300V pack would be <1 cm thick). Highly porous SSE scaffold creates large interface area significantly decreasing cell impedance.

FIG. 4. (a) Ionic conductivity of examples of Li-garnets. (b) PXRD of an example of a $Li_{6.75}La_2BaTa_{1.75}Zn_{0.25}O_{12}$.

Figure 5:
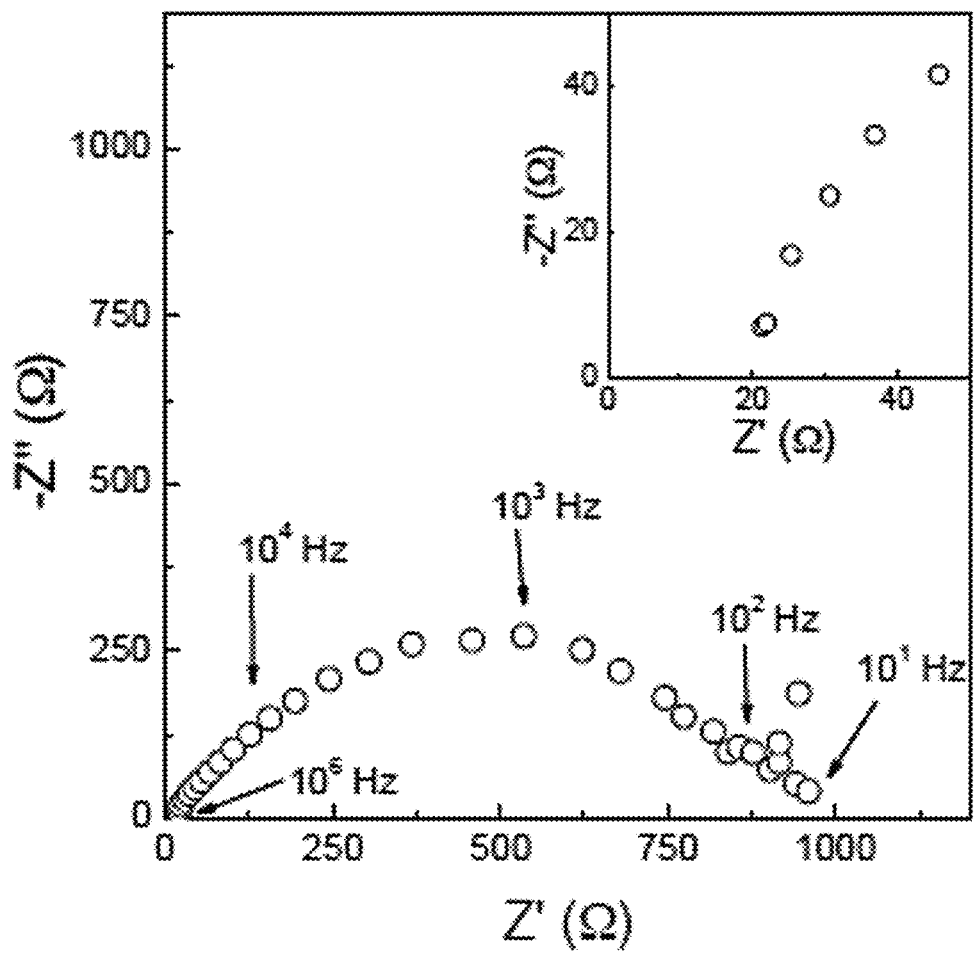

FIG. 5. Electrochemical impedance spectroscopy (EIS) of an example of a SSE battery with $LiFePO_4$ cathode (20% carbon black), dense SSE, Li infiltrated SSE scaffold, and Al current collector. The absence of additional low-frequency intercept indicates electrolyte interface is reversible for Li ions.

Figure 6:
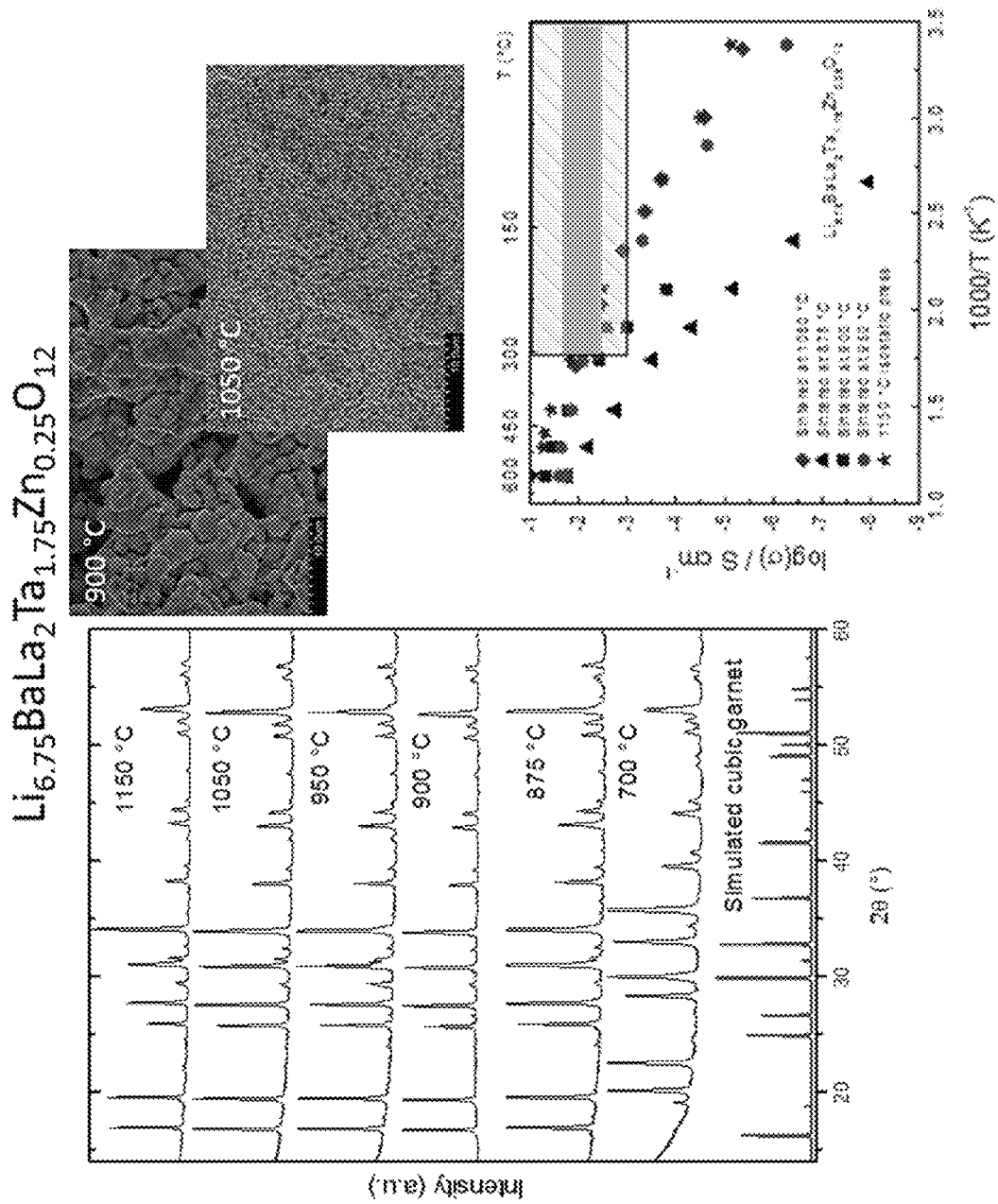

FIG. 6. PXRD showing the formation of a garnet-type $Li_{6.75}La_2BaTa_{1.75}Zn_{0.25}O_{12}$ as a function of temperature, SEM images and conductivity show sintering temperature can control the density, particle size, and conductivity.

FIG. 7. Examples of multilayer ceramic processing: (a) tape cast support; (b) thin electrolyte on layered porous anode support with bimodally integrated anode functional layer (BI-AFL); and (c) magnification of BI-AFL showing ability to integrate nano-scale features for reduced interfacial impedance with conventional ceramic processing.

FIG. 8. (a) Cross section and (b) top view of an example of a SSE with porous scaffold, in which anode and cathode materials will be filled. (c) Cross-section of SSE scaffold after Li metal infiltration. (d) Cross section at Li-metal-dense SSE interface. Images demonstrate excellent Li wetting of SSE was obtained.

DETAILED DESCRIPTION OF THE DISCLOSURE

The present disclosure provides ion conducting batteries having a solid state electrolyte. For example, the batteries are lithium-ion, solid-state electrolyte batteries, sodium-ion, solid-state electrolyte batteries, or magnesium-ion solid-state electrolyte batteries. Lithium-ion ($Li^+$) batteries are used, for example, in portable electronics and electric cars, sodium-ion ($Na^+$) batteries are used, for example, for electric grid storage to enable intermittent renewable energy deployment such as solar and wind, and magnesium-ion ($Mg^{2+}$) batteries are expected to have higher performance than $Li^+$ and $Na^+$ because $Mg^{2+}$ carries twice the charge for each ion.

The solid-state batteries have advantages over previous batteries. For example, the solid electrolyte is non-flammable providing enhanced safety, and also provides greater stability to allow high voltage electrodes for greater energy density. The battery design (FIG. 3) provides additional advantages in that it allows for a thin electrolyte layer and a larger electrolyte/electrode interfacial area, both resulting in lower resistance and thus greater power and energy density. In addition, the structure eliminates mechanical stress from ion intercalation during charging and discharging cycles and the formation of solid electrolyte interphase (SEI) layers, thus removing the capacity fade degradation mechanisms that limit lifetime of current battery technology.

The solid state batteries comprise a cathode material, an anode material, and an ion-conducting, solid-state electrolyte material. The solid-state electrolyte material has a dense region (e.g. a layer) and one or two porous regions (layers). The porous region(s) can be disposed on one side of the dense region or disposed on opposite sides of the dense region. The dense region and porous region(s) are fabricated from the same solid-state electrolyte material. The batteries conduct ions such as, for example, lithium ions, sodium ions, or magnesium ions.

The cathode comprises cathode material in electrical contact with the porous region of the ion-conducting, solid-state electrolyte material. For example, the cathode material is an ion-conducting material that stores ions by mechanisms such as intercalation or reacts with the ion to form a secondary phase (e.g., an air or sulfide electrode). Examples of suitable cathode materials are known in the art.

The cathode material, if present, is disposed on at least a portion of a surface (e.g., a pore surface of one of the pores) of a porous region of the ion-conducting, solid-state electrolyte material. The cathode material, when present, at least partially fills one or more pores (e.g., a majority of the pores) of a porous region or one of the porous regions of the ion-conducting, solid-state electrolyte material. In an embodiment, the cathode material is infiltrated into at least a portion of the pores of the porous region of the ion-conducting, solid-state electrolyte material.

In an embodiment, the cathode material is disposed on at least a portion of the pore surface of the cathode side of the porous region of the ion-conducting, SSE material, where the cathode side of the porous region of ion-conducting, SSE material is opposed to an anode side of the porous region of ion-conducting, SSE material on which the anode material is disposed.

In an embodiment, the cathode material is a lithium ion-conducting material. For example, the lithium ion-conducting cathode material is, lithium nickel manganese cobalt oxides (NMC, $LiNi_xMn_yCo_zO_2$, where x+y+z=1), such as $LiCoO_2$, $LiNi_{1/3}Co_{1/3}Mn_{1/3}O_2$, $LiNi_{0.5}Co_{0.2}Mn_{0.3}O_2$, lithium manganese oxides (LMOs), such as $LiMn_2O_4$, $LiNi_{0.5}Mn_{1.5}O_4$, lithium iron phosphates (LFPs) such as $LiFePO_4$, $LiMnPO_4$, and $LiCoPO_4$, and $Li_2MMn_3O_8$, where M is selected from Fe, Co, and combinations thereof. In an embodiment, the ion-conducting cathode material is a high energy ion-conducting cathode material such as $Li_2MMn_3O_8$, wherein M is selected from Fe, Co, and combinations thereof.

In an embodiment, the cathode material is a sodium ion-conducting material. For example, the sodium ion-conducting cathode material is $Na_2V_2O_5$, P2-$Na_{2/3}Fe_{1/2}Mn_{1/2}O_2$, $Na_3V_2(PO_4)_3$, $NaMn_{1/3}Co_{1/3}Ni_{1/3}PO_4$ and composite materials (e.g., composites with carbon black) thereof such as $Na_{2/3}Fe_{1/2}Mn_{1/2}O_2$@graphene composite.

In an embodiment, the cathode material is a magnesium ion-conducting material. For example, the magnesium ion-conducting cathode material is doped manganese oxide (e.g., $Mg_xMnO_{2-y}H_2O$).

In an embodiment, the cathode material is an organic sulfide or polysulfide. Examples of organic sulfides include carbynepolysulfide and copolymerized sulfur.

In an embodiment, the cathode material is an air electrode. Examples of materials suitable for air electrodes include those used in solid-state lithium ion batteries with air cathodes such as large surface area carbon particles (e.g., Super P which is a conductive carbon black) and catalyst particles (e.g., alpha-$MnO_2$ nanorods) bound in a mesh (e.g., a polymer binder such as PVDF binder).

It may be desirable to use an electrically conductive material as part of the ion-conducting cathode material. In an embodiment, the ion-conducting cathode material also comprises an electrically conducting carbon material (e.g., graphene or carbon black), and the ion-conducting cathode material, optionally, further comprises a organic or gel ion-conducting electrolyte. The electrically conductive material may separate from the ion-conducting cathode material. For example, electrically conductive material (e.g., graphene) is disposed on at least a portion of a surface (e.g., a pore surface) of the porous region of the ion-conducting, SSE electrolyte material and the ion-conducting cathode material is disposed on at least a portion of the electrically conductive material (e.g., graphene).

The anode comprises anode material in electrical contact with the porous region of the ion-conducting, SSE material. For example, the anode material is the metallic form of the ion conducted in the solid state electrolyte (e.g., metallic lithium for a lithium-ion battery) or a compound that intercalates the conducting ion (e.g., lithium carbide, $Li_6C$, for a lithium-ion battery). Examples of suitable anode materials are known in the art.

The anode material, if present, is disposed on at least a portion of a surface (e.g., a pore surface of one of the pores) of the porous region of the ion-conducting, SSE material. The anode material, when present, at least partially fills one or more pores (e.g., a majority of the pores) of the porous region of ion-conducting, SSE electrolyte material. In an embodiment, the anode material is infiltrated into at least a portion of the pores of the porous region of the ion-conducting, solid-state electrolyte material.

In an embodiment, the anode material is disposed on at least a portion of the pore surface of an anode-side porous region of the ion-conducting, SSE electrolyte material, where the anode side of the ion-conducting, solid-state electrolyte material is opposed to a cathode side of the porous, ion-conducting, SSE on which the cathode material is disposed.

In an embodiment, the anode material is a lithium-containing material. For example, the anode material is lithium metal, or an ion-conducting lithium-containing anode material such as lithium titanates (LTOs) such as $Li_4Ti_5O_{12}$.

In an embodiment, the anode material is a sodium-containing material. For example, the anode material is sodium metal, or an ion-conducting sodium-containing anode material such as $Na_2C_8H_4O_4$ and $Na_{0.66}Li_{0.22}Ti_{0.78}O_2$.

In an embodiment, the anode material is a magnesium-containing material. For example, the anode material is magnesium metal.

In an embodiment, the anode material is a conducting material such as graphite, hard carbon, porous hollow carbon spheres and tubes, and tin and its alloys, tin/carbon, tin/cobalt alloy, or silicon/carbon.

The ion-conducting, solid-state electrolyte material has a dense regions (e.g., a dense layer) and one or two porous regions (e.g., porous layer(s)). The porosity of the dense region is less than that of the porous region(s). In an embodiment, the dense region is not porous. The cathode material and/or anode material is disposed on a porous region of the SSE material forming a discrete cathode material containing region and/or a discrete anode material containing region of the ion-conducting, solid-state electrolyte material. For example, each of these regions of the ion-conducting, solid-state electrolyte material has, independently, a dimension (e.g., a thickness perpendicular to the longest dimension of the material) of 20 μm to 200 μm, including all integer micron values and ranges therebetween.

The dense regions and porous regions described herein can be discrete dense layers and discrete porous layers. Accordingly, in an embodiment, the ion-conducting, solid-state electrolyte material has a dense layer and one or two porous layers.

The ion-conducting, solid-state electrolyte material conducts ions (e.g., lithium ions, sodium ions, or magnesium ions) between the anode and cathode. The ion-conducting, solid-state electrolyte material is free of pin-hole defects. The ion-conducting solid-state electrolyte material for the battery or battery cell has a dense region (e.g., a dense layer) that is supported by one or more porous regions (e.g., porous layer(s)) (the porous region(s)/layer(s) are also referred to herein as a scaffold structure(s)) comprised of the same ion-conducting, solid-state electrolyte material.

In an embodiment, the ion-conducting solid state electrolyte has a dense region (e.g., a dense layer) and two porous regions (e.g., porous layers), where the porous regions are disposed on opposite sides of the dense region and cathode material is disposed in one of the porous regions and the anode material in the other porous region.

In an embodiment, the ion-conducting solid state electrolyte has a dense region (e.g., a dense layer) and one porous region (e.g., porous layer), where the porous regions are disposed on one sides of the dense region and either cathode material or anode material is disposed in the porous region. If cathode material is disposed in the porous region, a conventional battery anode (e.g., a conventional solid-state battery anode) is formed on the opposite side of the dense region by known methods. If anode material is disposed in the porous region, a conventional battery cathode (e.g., a conventional solid-state battery cathode) is formed on the opposite side of the dense region.

The porous region (e.g., porous layer) of the ion-conducting, solid-state electrolyte material has a porous structure. The porous structure has microstructural features (e.g., microporosity) and/or nanostructural features (e.g., nanoporosity). For example, each porous region, independently, has a porosity of 10% to 90%, including all integer % values and ranges therebetween. In another example, each porous region, independently, has a porosity of 30% to 70%, including all integer % values and ranges therebetween. Where two porous regions are present the porosity of the two layers may be the same or different. The porosity of the individual regions can be selected to, for example, accommodate processing steps (e.g., higher porosity is easier to fill with electrode material (e.g., charge storage material) (e.g., cathode)) in subsequent screen-printing or infiltration step, and achieve a desired electrode material capacity, i.e., how much of the conducting material (e.g., Li, Na, Mg) is stored in the electrode materials. The porous region (e.g., layer) provide structural support to the dense layer so that the thickness of the dense layer can be reduced, thus reducing its resistance. The porous layer also extends ion conduction of the dense phase (solid electrolyte) into the electrode layer to reduce electrode resistance both in terms of ion conduction through electrode and interfacial resistance due to charge transfer reaction at electrode/electrolyte interface, the later improved by having more electrode/electrolyte interfacial area.

In an embodiment, the solid-state, ion-conducting electrolyte material is a solid-state electrolyte, lithium-containing material. For example, the solid-state electrolyte, lithium-containing material is a lithium-garnet SSE material.

In an embodiment, the solid-state, ion-conducting electrolyte material is a Li-garnet SSE material comprising cation-doped $Li_5La_3M'_2O_{12}$, cation-doped $Li_6La_2BaTa_2O_{12}$, cation-doped $Li_7La_3Zr_2O_{12}$, and cation-doped $Li_6BaY_2M'_2O_{12}$. The cation dopants are barium, yttrium, zinc, or combinations thereof and M' is Nb, Zr, Ta, or combinations thereof.

In an embodiment, the Li-garnet SSE material comprises $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

In an embodiment, the, solid-state, ion-conducting electrolyte material sodium-containing, solid-state electrolyte, material. For example, the sodium-containing, solid-state electrolyte is $Na_3Zr_2Si_2PO_{12}$ (NASICON) or beta-alumina.

In an embodiment, the, solid-state, ion-conducting electrolyte material is a, solid-state electrolyte, magnesium-containing material. For example, the magnesium ion-conducting electrolyte material is $MgZr_4P_6O_{24}$.

The ion-conducting, solid-state electrolyte material has a dense region that free of the cathode material and anode material. For example, this region has a dimension (e.g., a thickness perpendicular to the longest dimension of the material) of 1 μm to 100 μm, including all integer micron values and ranges therebetween. In another example, this region has a dimension of 5 μm to 40 μm.

In an embodiment, the solid state battery comprises a lithium-containing cathode material and/or a lithium-containing anode material, and a lithium-containing, ion-conducting, solid-state electrolyte material. In an embodiment, the solid state battery comprises a sodium-containing cathode material and/or a sodium-containing anode material, and a sodium-containing, ion-conducting, solid-state electrolyte material. In an embodiment, the solid state battery comprises a magnesium-containing cathode material and/or a magnesium-containing anode material, and a magnesium-containing, ion-conducting, solid-state electrolyte material.

The solid-state, ion-conducting electrolyte material is configured such that ions (e.g., lithium ions, sodium ions, or magnesium ions) diffuse into and out of the porous region(s) (e.g., porous layer(s)) of the solid-state, ion-conducting electrolyte material during charging and/or discharging of the battery. In an embodiment, the solid-state, ion-conducting battery comprises a solid-state, ion-conducting electrolyte material comprising one or two porous regions (e.g., porous layer(s)) configured such that ions (e.g., lithium ions, sodium ions, or magnesium ions) diffuse into and out of the porous region(s) of solid-state, ion-conducting electrolyte material during charging and/or discharging of the battery.

One of ordinary skill in the art would understand that a number of processing methods are known for processing/forming the porous, solid-state, ion-conducting electrolyte material such as high temperature solid-state reaction processes, co-precipitation processes, hydrothermal processes, sol-gel processes.

The material can be systematically synthesized by solid-state mixing techniques. For example, a mixture of starting materials may be mixed in an organic solvent (e.g., ethanol or methanol) and the mixture of starting materials dried to evolve the organic solvent. The mixture of starting materials may be ball milled. The ball milled mixture may be calcined. For example, the ball milled mixture is calcined at a temperature between 500° C. and 2000° C., including all integer ° C. values and ranges therebetween, for least 30 minutes to at least 50 hours. The calcined mixture may be milled with media such as stabilized-zirconia or alumina or another media known to one of ordinary skill in the art to achieve the prerequisite particle size distribution. The calcined mixture may be sintered. For example, the calcined mixture is sintered at a temperature between 500° C. and 2000° C., including all integer ° C. values and ranges therebetween, for at least 30 minutes to at least 50 hours. To achieve the prerequisite particle size distribution, the calcined mixture may be milled using a technique such as vibratory milling, attrition milling, jet milling, ball milling, or another technique known to one of ordinary skill in the art, using media such as stabilized-zirconia, alumina, or another media known to one of ordinary skill in the art.

One of ordinary skill in the art would understand that a number of conventional fabrication processing methods are known for processing the ion-conducting SSE materials such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green-form material may then be sintered to form the ion-conducting SSE materials using a technique known to one of ordinary skill in the art, such as conventional thermal processing in air, or controlled atmospheres to minimize loss of individual components of the ion-conducting SSE materials. In some embodiments of the present invention it is advantageous to fabricate ion-conducting SSE materials in a green-form by die-pressing, optionally followed by isostatic pressing. In other embodiments it is advantageous to fabricate ion-conducting SSE materials as a multi-channel device in a green-form using a combination of techniques such as tape casting, punching, laser-cutting, solvent bonding, heat lamination, or other techniques known to one of ordinary skill in the art.

Standard x-ray diffraction analysis techniques may be performed to identify the crystal structure and phase purity of the solid sodium electrolytes in the sintered ceramic membrane.

The solid state batteries (e.g., lithium-ion solid state electrolyte batteries, sodium-ion solid state electrolyte batteries, or magnesium-ion solid state electrolyte batteries) comprise current collector(s). The batteries have a cathode-side (first) current collector disposed on the cathode-side of the porous, solid-state electrolyte material and an anode-side (second) current collector disposed on the anode-side of the porous, solid-state electrolyte material. The current collector are each independently fabricated of a metal (e.g., aluminum, copper, or titanium) or metal alloy (aluminum alloy, copper alloy, or titanium alloy).

The solid-state batteries (e.g., lithium-ion solid state electrolyte batteries, sodium-ion solid state electrolyte batteries, or magnesium-ion solid state electrolyte batteries) may comprise various additional structural components (such as bipolar plates, external packaging, and electrical contacts/leads to connect wires. In an embodiment, the battery further comprises bipolar plates. In an embodiment, the battery further comprises bipolar plates and external packaging, and electrical contacts/leads to connect wires. In an embodiment, repeat battery cell units are separated by a bipolar plate.

The cathode material (if present), the anode material (if present), the SSE material, the cathode-side (first) current collector (if present), and the anode-side (second) current collector (if present) may form a cell. In this case, the solid-state, ion-conducting battery comprises a plurality of cells separated by one or more bipolar plates. The number of cells in the battery is determined by the performance requirements (e.g., voltage output) of the battery and is limited only by fabrication constraints. For example, the solid-state, ion-conducting battery comprises 1 to 500 cells, including all integer number of cells and ranges therebetween.

In an embodiment, the ion-conducting, solid-state battery or battery cell has one planar cathode and/or anode electrolyte interface or no planar cathode and/or anode electrolyte interfaces. In an embodiment, the battery or battery cell does not exhibit solid electrolyte interphase (SEI).

The following examples are presented to illustrate the present disclosure. They are not intended to limiting in any manner.

Example 1

The following is an example describing the solid-state lithium ion batteries of the present disclosure and making same.

The flammable organic electrolytes of conventional batteries can be replaced with non-flammable ceramic-based solid-state electrolytes (SSEs) that exhibit, for example, room temperature ionic conductivity of $\geq 10^{-3}$ Scm$^{-1}$ and electrochemical stability up to 6V. This can further allow replacement of typical LiCoO$_2$ cathodes with higher voltage cathode materials to increase power/energy densities. Moreover, the integration of these ceramic electrolytes in a planar stacked structure with metal current collectors will provide battery strength.

Intrinsically safe, robust, low-cost, high-energy-density all-solid-state Li-ion batteries (SSLiBs), can be fabricated by integrating high conductivity garnet-type solid Li ion electrolytes and high voltage cathodes in tailored micro/nano-structures, fabricated by low-cost supported thin-film ceramic techniques. Such batteries can be used in electric vehicles.

Li-garnet solid-state electrolytes (SSEs) that have, for example, a room temperature (RT) conductivity of ~$10^{-3}$ Scm$^{-1}$ (comparable to organic electrolytes) can be used. The can be increased to ~$10^{-2}$ Scm$^{-1}$ by increasing the disorder of the Li-sublattice. The highly stable garnet SSE allows use of Li$_2$MMn$_3$O$_8$ (M=Fe, Co) high voltage (~6V) cathodes and Li metal anodes without stability or flammability concerns.

Known fabrication techniques can be used to form electrode supported thin-film (~10 nm) SSEs, resulting in an area specific resistance (ASR) of only ~0.01 Ωcm$^{-2}$. Use of scaleable multilayer ceramic fabrication techniques, without need for dry rooms or vacuum equipment, provide dramatically reduced manufacturing cost.

Moreover, the tailored micro/nanostructured electrode support (scaffold) will increase interfacial area, overcoming the high impedance typical of planar geometry solid-state lithium ion batteries (SSLiBs), resulting in a C/3 IR drop of only 5.02 mV. In addition, charge/discharge of the Li-anode and Li$_2$MMn$_3$O$_8$ cathode scaffolds by pore-filling provides high depth of discharge ability without mechanical cycling fatigue seen with typical electrodes.

At ~170 nm/repeat unit, a 300V battery pack would only be <1 cm thick. This form factor with high strength due to Al bipolar plates allows synergistic placement between framing elements, reducing effective weight and volume. Based on the SSLiB rational design, targeted SSE conductivity, high voltage cathode, and high capacity electrodes the expected effective specific energy, including structural bipolar plate, is ~600 Wh/kg at C/3. Since bipolar plates provide strength and no temperature control is necessary this is essentially a full battery pack specification other than the external can. The corresponding effective energy density is 1810 Wh/L.

All the fabrication processes can be done with conventional ceramic processing equipment in ambient air without the need of dry rooms, vacuum deposition, or glove boxes, dramatically reducing cost of manufacturing.

For the all solid-state battery with no SEI or other performance degradation mechanisms inherent in current state-of-art Li-batteries, the calendar life of the instant battery is expected to exceed 10 years and cycle life is expected to exceed 5000 cycles.

Solid-state Li-garnet electrolytes (SSEs) have unique properties for SSLiBs, including room temperature (RT) conductivity of ~$10^{-3}$ Scm$^{-1}$ (comparable to organic electrolytes) and stability to high voltage (~6V) cathodes and Li-metal anodes without flammability concerns.

Use of SSE oxide powders can enable use of low-cost scaleable multilayer ceramic fabrication techniques to form electrode supported thin-film (~10 μm) SSEs without need for dry rooms or vacuum equipment, as well as engineered micro/nano-structured electrode supports to dramatically increase interfacial area. The later will overcome the high interfacial impedance typical of planar geometry SSLiBs, provide high depth of discharge ability without mechanical cycling fatigue seen with typical electrodes, as well as avoid SEI layer formation.

The SSE scaffold/electrolyte/scaffold structure will also provide mechanical strength, allowing for the integration of structural metal interconnects (bipolar plates) between planar cells, to improve strength, weight, thermal uniformity, and form factor. The resulting strength and form factor provides potential for the battery pack to be load bearing.

Highly Li$^+$ conducting and high voltage stable garnet type solid electrolytes can be made by doping specific cations for Ta and Zr in Li$_5$La$_3$Ta$_2$O$_{12}$, Li$_6$La$_2$BaTa$_2$O$_{12}$ and Li$_7$La$_3$Zr$_2$O$_{12}$, to extend RT conductivity from ~$10^{-3}$ to ~$10^{-2}$ Scm$^{-1}$. Compositions having desirable conductivity, ionic transference number, and electrochemical stability up to 6V against elemental Li can be determined.

Electrode supported thin film SSEs can be fabricated. Submicron SSE powders and SSE ink/paste formulations thereof can be made. Tape casting, colloidal deposition, and sintering conditions can be developed to prepare dense thin-film (~10 μm) garnet SSEs on porous scaffolds.

Cathode and anode can be integrated. Electrode-SSE interface structure and SSE surface can be optimized to minimize interfacial impedance for targeted electrode compositions. High voltage cathode inks can be made to fabricate SSLiBs with high voltage cathode and Li-metal anode incorporated into the SSE scaffold. The SSLiB electrochemical performance can be determined by measurements including CV, energy/power density and cycling performance.

Stacked multi-cell SSLiBs with Al/Cu bipolar plates can be assembled. Energy/power density, cycle life, and mechanical strength as a function of layer thicknesses and area for the stacked multi-cell SSLiBs can be determined.

Li-Stuffed Garnets SSEs. Conductivity of Li-Garnet SSEs can be improved doping to increase the Li content ("stuffing") of the garnet structure. Li-stuffed garnets exhibit desirable physical and chemical properties for SSEs including:

RT bulk conductivity (~$10^{-3}$ S/cm) for cubic $Li_7La_3Zr_2O_{12}$.

High electrochemical stability for high voltage cathodes (up to 6 V), about 2 V higher than current organic electrolytes and about 1 V higher than the more popular LiPON.

Excellent chemical stability in contact with elemental and molten Li anodes up to 400° C.

$Li^+$ transference number close to the maximum of 1.00, which is important to battery cycle efficiency, while typical polymer electrolytes are only ~0.35.

Wide operating temperature capability, electrical conductivity that increases with increasing temperature reaching 0.1 $Scm^{-1}$ at 300° C., and maintains appreciable conductivity below 0° C. In contrast, polymer electrolytes are flammable at high temperature Synthesizable as simple mixed oxide powders in air, hence easy scale up for bulk synthesis.

Figure 1:
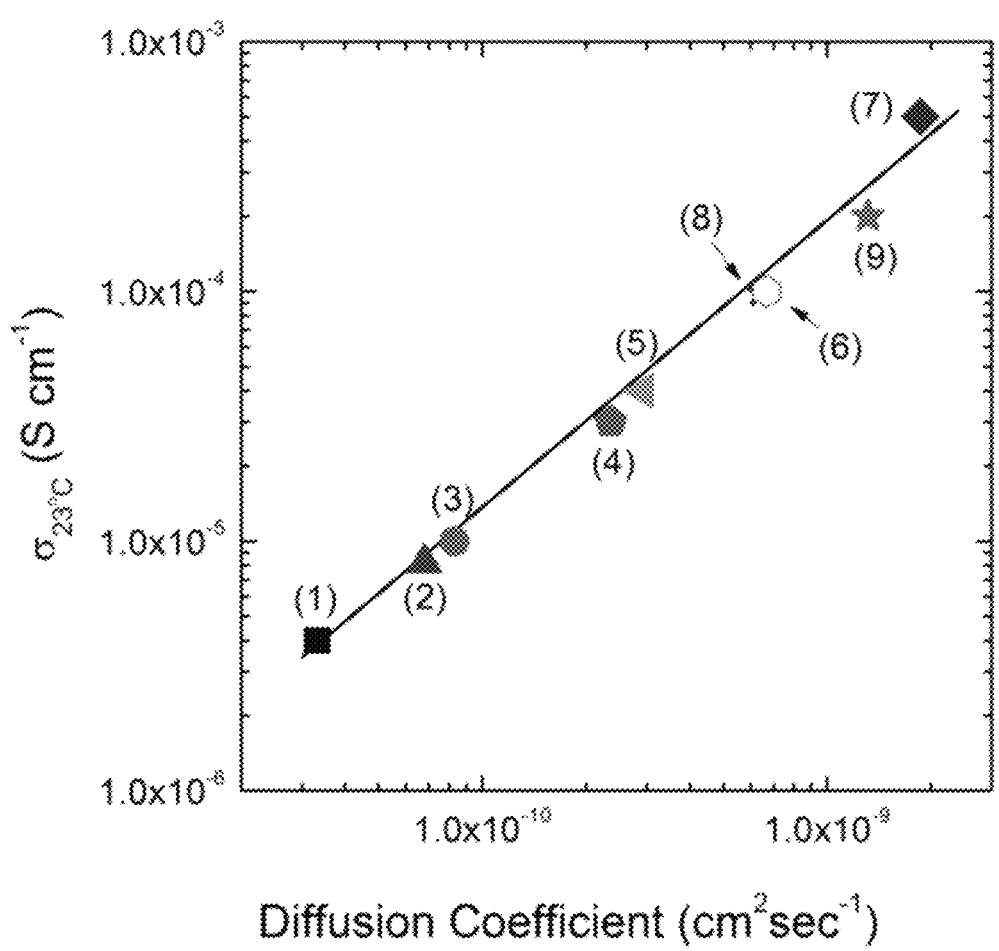
FIG. 1. Ionic conductivity vs. diffusion coefficient of garnet-type compounds: (1) $Li_5La_3Ta_2O_{12}$, (2) $Li_5La_3Sb_2O_{12}$, (3) $Li_5La_3Nb_2O_{12}$, (4) $Li_{5.5}BaLa_2Ta_2O_{11.75}$, (5) $Li_6La_2BaTaO_{12}$, (6) $Li_{6.5}BaLa_2Ta_2O_{12.25}$, (7)

$Li^+$ conductivity of garnet SSEs can be further increased. The Li ion conductivity of garnet is highly correlated to the concentration of $Li^+$ in the crystal structure. FIG. 1 shows the relationship between the $Li^+$ conductivity and diffusion coefficient for various Li-stuffed garnets. The conductivity increases with Li content, for example, the cubic $Li_7$-phase ($Li_7La_3Zr_2O_{12}$) exhibits a RT conductivity of $5\times10^{-4}$ S/cm. However, conductivity also depends on synthesis conditions, including sintering temperature. The effects of composition and synthesis method can be determined to achieve a minimum RT conductivity of ~$10^{-3}$ S/cm for the scaffold supported SSE layer. It is expected the RT conductivity can be increased to ~$10^{-2}$ S/cm through doping to increase the disorder of the Li sublattice. Ionic conduction in the garnet structure occurs around the metal-oxygen octahedron, and site occupancy of Li ions in tetrahedral vs. octahedral sites directly controls the Li ion conductivity (FIG. 2). For example, in $Li_5La_3Ta_2O_{12}$, about 80% of Li ions occupy the tetrahedral sites while only 20% occupy octahedral sites. Increasing the $Li^+$ concentration at octahedral sites while decreasing occupancy of the tetrahedral sides has been shown to result in an order of magnitude increase in ionic conductivity (FIG. 2b). Smaller-radii metal ions (e.g., Y3+), which are chemically stable in contact with elemental Li and isovalent with La, can be doped to develop a new series of garnets: $Li_6BaY_2M_2O_{12}$, $Li_{6.4}Y_3Zr_{1.6}Ta_{0.6}O_{12}$, $Li_7Y_3Zr_2O_{12}$, and their solid solutions; to increase ionic conductivity. The enthalpy of formation of $Y_2O_3$ (−1932 kJ/mol) is lower than that of $La_2O_3$ (−1794 kJ/mol), hence, doping Y for La will increase Y—O bond strength and weaken Li—O bonds. Thus increasing $Li^+$ mobility due to weaker lithium to oxygen interaction energy. Further, it is expected that Y will provide a smoother path for ionic conduction around the metal oxygen octahedral due to its smaller ionic radius (FIG. 2a).

In another approach, we can substitute $M^{2+}$ cations (e.g., $Zn^{2+}$, a 3d° cation known to form distorted metal-oxygen octandera) for the $M^{5+}$ sites in $Li_6BaY_2M_2O_{12}$. ZnO is expected to play a dual role of both further increasing the concentration of mobile Li ions in the structure and decreasing the final sintering temperature. Each $M^{2+}$ will add three more $Li^+$ for charge balance and these ions will occupy vacant $Li^+$ sites in the garnet structure. Thus, further increase $Li^+$ conduction can be obtained by modifying the garnet composition to control the crystal structure, Li-site occupancy, and minimize the conduction path activation energy.

Due to the ceramic powder nature of Li-garnets, SSLiBs can be fabricated using conventional fabrication techniques. This has tremendous advantages in terms of both cost and performance. All the fabrication processes can be done with conventional ceramic processing equipment in ambient air without the need of dry rooms, vacuum deposition, or glove boxes, dramatically reducing cost of manufacturing.

The SSLiBs investigated to date suffer from high interfacial impedance due to their low surface area, planar electrode/electrolyte interfaces (e.g., LiPON based SSLiBs). Low area specific resistance (ASR) cathodes and anodes can be achieved by integration of electronic and ionic conducting phases to increase electrolyte/electrode interfacial area and extend the electrochemically active region farther from the electrolyte/electrode planar interface. It is expected that modification of the nano/microstructure of the electrolyte/electrode interface (for example, by colloidal deposition of powders or salt solution impregnation) can reduce overall cell area specific resistance (ASR), resulting in an increase in power density relative to identical composition and layer thickness cells. These same advances can be applied to decrease SSLiB interfacial impedance. The SSLiB will be made by known fabrication techniques Low-cost, high-speed, scaleable multi-layer ceramic processing can be used to fabricate supported thin-film (~10 μm) SSEs on tailored nano/micro-structured electrode scaffolds. ~50 and 70 μm tailored porosity (nano/micro features) SSE garnet support layers (scaffolds) can be tape cast, followed by colloidal deposition of a ~10 μm dense garnet SSE layer and sintering. The resulting pinhole-free SSE layer is expected to be mechanically robust due to support layers and have a low area specific resistance ASR, for example, only 0.01 $\Omega cm^{-2}$. $Li_2MMn_3O_8$ will be screen printed into the porous cathode scaffold and initial Li-metal will be impregnated in the porous anode scaffold (FIG. 3). For example, $Li_2(Co,Fe)Mn_3O_8$ high voltage cathodes can be prepared in the form of nano-sized powders using wet chemical methods. The nano-sized electrode powders can be mixed with conductive materials such as graphene or carbon black and polymer binder in NMP solvent. Typical mass ratio for cathode, conductive additive or binder is 85%:10%:5% by weight. The slurry viscosity can be optimized for filling the porous SSE scaffold, infiltrated in and dried. An Li-metal flashing of Li nanoparticles may be infiltrated in the porous anode scaffold or the Li can be provided fully from the cathode composition so dry room processing can be avoided.

Another major advantage of this structure is that charge/discharge cycles will involve filling/emptying of the SSE scaffold pores (see FIG. 3), rather than intercalating and expanding carbon anode powders/fibers. As a result there will be no change in electrode dimensions between charged and discharged state. This is expected to remove both cycle fatigue and limitations on depth of discharge, the former allowing for greater cycle life and the later for greater actual battery capacity.

Moreover, there will be no change in overall cell dimensions allowing for the batteries to be stacked as a structural unit. Light-weight, ~40 micron thick Al plates will serve not only as current collectors but also provide mechanical strength. ~20 nm of Cu can be electrodeposited on the anode side for electrochemical compatibility with Li. The bipolar current collector plates can be applied before the slurry is fully dried and pressed to improve the electrical contact between bipolar current collector and the electrode materials.

Compared to current LiBs with organic electrolytes, the SSLiB with intrinsically safe solid state chemistry is expected to not only increase the specific energy density and decrease the cost on the cell level, but also avoid demanding packing level and system level engineering requirements. High specific energy density at both cell and system level can be achieved, relative to the state-of-the-art, by the following:

Stable electrochemical voltage window of garnet SSE allows for high voltage cathodes resulting in high cell voltage (~6 V).

Porous SSE scaffold allows use of high specific capacity Li-metal anode.

Porous 3-dimensionally networked SSE scaffolds allows electrode materials to fill volume with a smaller charge transfer resistance, increasing mass percentage of active electrode materials.

Bipolar plates will be made by electroplating ~200 Å Cu on ~40 μm Al plates. Given the 3× lower density of Al vs. Cu the resulting plate will have same weight as the sum of the ~10 μm Al and Cu foils used in conventional batteries. However, with 3× the strength (due to ~9× higher strength-to-weight ratio of Al vs. Cu).

The repeat unit (SSLiB/bipolar plate) will then be stacked in series to obtain desired battery pack voltage (e.g., fifty 6V SSLiBs for a 300V battery pac would be <1 cm thick).

Thermal and electrical control/management systems are not needed as there is no thermal runaway concern.

The proposed intrinsically safe SSLiBs also drastically reduces mechanical protection needs.

The energy density is calculated from component thicknesses of device structure (FIG. 4) normalized to 1 cm$^2$ area (see data in Table 1). The estimated SSE scaffold porosity is 70% for the cathode and 30% for the anode. The charge/capacity is balanced for the anode and cathode by: $m_{Li} \times C_{Li} = m_{LMFO} \times C_{LMFO}$, where LFMO stands for $Li_2FeMn_3O_8$. Therefore, the total mass (cathode-scaffold/SSE/scaffold and bipolar plate) is calculated to be 50.92 mg per cm$^2$ area. Note it is our intent to fabricate charged cells with all Li in cathode to avoid necessity of dry room. Thus, anode-scaffold would be empty of Li metal for energy density calculations.

TABLE 1

Material parameters for energy density calculation.

| Material | Density (g/cm$^3$) | Mass per cm$^2$ (mg) | Capacity (mAh/g) | Voltage (Vs. Li)(V) |
|---|---|---|---|---|
| Cathode LFMO | 3.59 | 17.00 | 300 | 6 |
| Anode Li | 0.54 | 0 | 3800 | 0 |
| SSE | 5.00 | 27.5 | N/A | N/A |
| Al | 2.70 | 5.40 | N/A | N/A |
| Cu | 8.69 | 0.02 | N/A | N/A |
| Carbon additive | 1.00 | 1.00 | N/A | N/A |
| Cell Total | | 50.92 | | |

The corresponding total energy is $E_{tot} = C \times V = 5.13$ mAh×6 V=30.78 mWh. The total volume is $1.7 \times 10^{-5}$ L for 1 cm$^2$ area. Therefore, the theoretical effective specific energy, including structural bipolar plate, is ~603.29 Wh/kg. As calculated below, the overpotential at C/3 is negligible compared with the cell voltage, leading to an energy density at this rate close to theoretical. Since the bipolar plate provides strength and no temperature control is necessary this is essential the full battery pack specification other than external can. (In contrast, state-of-art LiBs have a ~40% decrease in energy density from cell level to pack level.) The corresponding effective energy density of the complete battery pack is ~1810 Wh/L.

A desirable rate performance is expected with the SSLiBs due to 3-dimensional (3D) networked scaffold structures, comparable to organic electrolyte based ones, and much better than traditional planar solid state batteries. The reasons for this include the following:

Porous SSE scaffolds provide extended 3D electrode-electrolyte interface, dramatically increasing the surface contact area and decreasing the charge-transfer impedance.

Use of SSE having a conductivity of $10^{-3}$-$10^{-2}$ S/cm in electrode scaffolds to provide continuous Li$^+$ conductive path.

Use of high aspect ratio (lateral dimension vs. thickness) graphene in electrode pores to provide continuous electron conductive path.

To calculate the rate performance, the overpotential of SSLiB, shown in FIG. 3, was estimated, including electrolyte impedance ($Z_{SSE}$) and electrode-electrolyte-interface impedance ($Z_{interface}$).

The porous SSE scaffold achieves a smaller interfacial impedance by: $1/Z_{interface} = S \times Gs$, where S is the interfacial area close to the porous SSE and Gs is the interfacial conductance per specific area. The interfacial impedance is expected to be small since the porous SSE results in a large electrode-electrolyte interfacial area. For ion transport impedance through the entire SSE structure: ZSSE=Zcathode-scaffold+Zdense-SSE+Zanode-scaffold; and $Z = (\rho L)/(A \times (1-\epsilon))$, where $\rho$=100 Ωcm, L is thickness (FIG. 3), A is 1 cm$^2$, ands is porosity (70% for the cathode scaffold, 50% for the anode scaffold and 0% for the dense SSE layer). Therefore, Zcathode-scaffold=2.3 Ohm/cm$^2$, Zdense-SSE=0.01 Ohm/cm$^2$, and Zanode-scaffold=1 Ohm/cm$^2$; resulting in Ztotal=3.31 Ohm/cm$^2$. At C/3, the current density=1.71 mA/cm$^2$ and the voltage drop is 5.02 mV/cm$^2$, which is negligible compared with a 6 V cell voltage.

Desirable cycling performance is expected due to the following advantages:

No structural challenges associated with intercalating and de-intercalating Li due to filling of 3D porous structure.

Excellent mechanical and electrochemical electrolyte-electrode interface stability due to 3D porous SSE structure.

No SEI formation inherent in current state-of-art LiBs, which consumes electrolyte and increase cell impedance.

No Li dendrite formation (problematic for LiBs with Li anodes) due to dense ceramic SSE. Therefore, the calendar life should easily exceed 10 years and the cycle life should easily exceed 5000 cycles.

The SSLiB is an advancement in battery materials and architecture. It can provide the necessary transformational change in battery performance and cost to accelerate vehicle electrification. As a result it can improve vehicle energy efficiency, reduce energy related emissions, and reduce energy imports.

FIG. 4 shows the conductivity for Li garnets, including $Li_{6.75}BaLa_2Ta_{1.75}Zn_{0.25}O_{12}$. It is expected that the lower activation energy of this composition will provide a path to achieve RT conductivity of ~$10^{-2}$ Scm-1 when similar substitutions are made in $Li_7La_3Zr_2O_{12}$.

Since garnet SSEs can be synthesized as ceramic powders (unlike LiPON) high-speed, scaleable multilayer ceramic fabrication techniques can be used to fabricate supported thin-film (~10 μm) SSEs on tailored nano/micro-structured electrode scaffolds (FIG. 3). Tape casting 50 and 70 μm tailored porosity (nano/micro features) SSE support layers, followed by colloidal deposition of a ~10 μm dense SSE layer and sintering can be used. The resulting pinhole-free SSE layer will be mechanically robust due to support layers and have a low area specific resistance ASR, of only ~0.01 $\Omega cm^{-2}$.

The ~6.0 volt cathode compositions ($Li_2MMn_3O_8$, M=Fe, Co) have been synthesized. These can be combined with SSE scaffold & graphene to increase ionic and electronic conduction, respectively, as well as to reduce interfacial impedance. $Li_2MMn_3O_8$ can be screen printed into the porous cathode scaffold and Li-metal impregnated in the porous anode scaffold.

FIG. 5 shows EIS results for a solid state Li cell tested using the Li infiltrated porous scaffold anode, supporting a thin dense SSE layer, and screen printed $LiFePO_4$ cathode. The high-frequency intercept corresponds to the dense SSE impedance and the low frequency intercept the entire cell impedance.

Bipolar plates can be fabricated by electroplating ~200 Å Cu on ~40 μm Al. Given the 3× lower density of Al vs. Cu the resulting plate will have same weight as the sum of the ~10 μm Al and Cu foils used in conventional batteries. However, with 3× the strength (due to ~9× higher strength-to-weight ratio of Al vs. Cu). Increases in strength can be achieved by simply increasing Al plate thickness with negligible effect on gravimetric and volumetric energy density or cost. The repeat unit (SSLiB/bipolar plate) can be stacked in series to obtain desired battery pack voltage (e.g., fifty 6V SSLiBs for a 300V battery pack would be <1 cm thick).

In terms of performance and cost:

The energy density of SSLiBs shown in FIG. 3 is ~600 Wh/kg based on a 6 V cell. A $Li_2FeMn_3O_8$ cathode has a voltage of 5.5 V vs. Li. With this cathode, energy density of 550 Wh/kg can be achieved.

The calculation for energy density in Table 3 does not include packing for protection of thermal runaway and mechanical damage as this is not necessary for SSLiBs. If 20% packaging is included, the total energy density is still 500 Wh/kg.

The voltage drop of ~5 mV for C/3 was based on SSE with an ionic conductivity of ~$10^{-2}$ S/cm (using the porous SSE scaffold with dense SSE layer and corresponding small interfacial charge transfer resistance). At an ionic conductivity of $5 \times 10^{-4}$ S/cm, the voltage drop for C/3 rate is only ~0.1V, which is significantly less than the cell voltage of 6 V.

The materials cost for SSLiBs is only ~50 $/KWh due to the high SSLiB energy density and corresponding reduction in materials to achieve the same amount of energy. The non-material manufacturing cost is expected, without the need of dry room, for our SSLiBs to be lower than that for current state-of-art LiBs.

The SSE materials can be synthesized using solid state and wet chemical methods. For example, corresponding metal oxides or salts can be mixed as solid-state or solution precursors, dried, and synthesized powders calcined between 700 and 1200° C. in air to obtain phase pure materials. Phase purity can be determined as a function of synthesis method and calcining temperature by powder X-ray diffraction (PXRD, D8, Bruker, Cukα). The structure can be determined by Rietveld refinements. Using structural refinement data, the metal-oxygen bond length and Li—O bond distance can be estimated to determine role of dopant in garnet structure on conductivity. In-situ PXRD can be performed to identify any chemical reactivity between the garnet-SSEs and the $Li_2$(Fe, Co)$Mn_3O_8$ high voltage cathodes as a function of temperature. The Li ion conductivity can be determined by electrochemical impedance spectroscopy (EIS-Solartron 1260) and DC (Solartron Potentiostat 1287) four-point methods. The electrical conductivity can be investigated using both $Li^+$ blocking Au electrodes and reversible elemental Li electrodes. The Li reversible electrode measurement will provide information about the SSE/electrode interface impedance in addition to ionic conductivity of the electrolyte, while the blocking electrode will provide information as to any electronic conduction (transference number determination). The concentration of $Li^+$ and other metal ions can be determined using inductively coupled plasma (ICP) and electron energy loss spectroscopy (EELS) to understand the role of Li content on ionic conductivity. The actual amount of Li and its distribution in the three different crystallographic sites of the garnet structure can be important to improve the conductivity and the concentration of mobile Li ions will be optimized to reach the RT conductivity value of $10^{-2}$ S/cm.

Sintering of low-density Li-garnet samples is responsible for a lot of the literature variability in conductivity (e.g., as shown in FIG. 6). The primary issue in obtaining dense SSEs is starting with submicron (or nano-scale) powders. By starting with nano-scale powders it is expected that the sintering temperature necessary to obtain fully dense electrolytes can be lowered. The nanoscale electrolyte and electrode powders can be made using co-precipitation, reverse-strike co-precipitation, glycine-nitrate, and other wet synthesis methods. These methods can be used to make desired Li-garnet compositions and to obtain submicron SSE powders. The submicron SSE powders can then be used in ink/paste formulations by mixing with appropriate binders and solvents to achieve desired viscosity and solids content. Dense thin-film (~10 μm) garnet SSEs on porous SSE scaffolds (e.g., FIG. 9b) can be formed by tape casting (FIG. 7a), colloidal deposition, and sintering. The methods described can be used to create nano-dimensional electrode/electrolyte interfacial areas to minimize interfacial polarization (e.g., FIG. 7c). The symmetric scaffold/SSE/scaffold structure shown in FIG. 3 can be achieved by laminating a scaffold/SSE layer with another scaffold layer in the green state (prior to sintering) using a heated lamination press.

Cathode and anode integration. Nanosized (~100 nm) cathode materials $Li_2MMn_3O_8$ (M=Fe, Co) can be synthesized. With the SSE that is stable up to 6V, a specific capacity of 300 mAh/g is expected. Slurries of cathode materials can be prepared by dispersing nanoparticles in N-Methyl-2-pyrrolidone (NMP) solution, with 10% (weight) carbon black and 5% (weight) Polyvinylidene fluoride (PVDF) polymer binder. The battery slurry can be applied to cathode side of porous SSE scaffold by drop casting. SSE with cathode materials can be heated at 100° C. for 2 hours to dry out the solvent and enhance electrode-electrolyte interfacial contact. Additional heat processing may be needed to optimize the interface. The viscosity of the slurry will be controlled by modifying solids content and binder/solvent concentrations to achieve a desired filling. The cathode particle size can be changed to control the pore filling in the SSE. In an example, all of the mobile Li will come from cathode (the anode SSE scaffold may be coated with a thin layer of graphitic material by solution processing to "start-up" electronic conduction in the cell). In another example, a thin layer of Li metal will be infiltrated and conformally coated inside anode SSE scaffold. Mild heating (~400° C.) of Li metal foil or commercial nanoparticles can be used to melt and infiltrate the Li. Excellent wetting between Li-metal and SSE is important and was obtained by modifying the surface of the SSE scaffold (FIG. 8). To fill the SSE pores in the anode side with highly conductive graphitic materials, a graphene dispersion can be prepared by known methods. For example, 1 mg/mL graphene flakes can be dispersed in water/IPA solvent by matching the surface energy between graphene and the mixed solvent. Drop coating can be used to deposit conductive graphene with a thickness of ~10 nm inside the porous SSE anode scaffold. After successfully filling the scaffold pores, the cell can be finished with metal current collectors. Al foil can be used for the cathode and Cu foil for the anode. Bipolar metals can be used for cell stacking and integration. To improve the electrical contact between electrodes and current collectors, a thin graphene layer may be applied. The finished device may be heated up to 100° C. for 10 minutes to further improve the electrical contact between the layers. The electrochemical performance of the SSLiB can be evaluated by cyclic voltammetry, galvanostatic charge-discharge at different rates, electrochemical impedance spectroscopy (EIS), and cycling performance at C/3. EIS can be used in a broad frequency range, from 1 MHz to 0.1 mHz, to investigate the various contributions to the device impedance, and reveal the interfacial impedance between the cathode and SSE by comparing the EIS of symmetrical cells with Li-metal electrodes. The energy density, power density, rate dependence, and cycling performance of each cell, as a function of SSE, electrode, SSE-electrolyte interface, and current collector-electrode interface can be determined.

Multi-cell (2-3 cells in series) SSLiBs with Al/Cu bipolar plates can be fabricated. The energy/power density and mechanical strength can be determined as a function of layer thicknesses and area.

What is claimed is:

1. A solid-state, ion-conducting battery comprising:
   a cathode comprising a cathode material or an anode comprising an anode material;
   a solid-state electrolyte (SSE) material comprising a porous region of sintered particles having a plurality of pores, and a dense region having a thickness of 1 to 100 microns that is too thin to be self-supporting, wherein the cathode material or the anode material is disposed on at least a portion of the porous region, particles of the porous region are fused into the dense region and the dense region is free of the cathode material and the anode material, and
   a current collector disposed on at least a portion of the cathode material or the anode material,
   wherein the dense region is supported by the porous region and the porous region of the SSE material that has the cathode material disposed thereon has a dimension of 20 µm to 200 µm and/or the porous region of the SSE material that has the anode material disposed thereon has a dimension of 20 µm to 200 µm.

2. The solid-state, ion-conducting battery of claim 1, wherein the cathode material is a lithium-containing material, a sodium-containing cathode material, or a magnesium-containing cathode material.

3. The solid-state, ion-conducting battery of claim 2, wherein
   the lithium-containing electrode material is a lithium-containing, ion-conducting cathode material selected from $LiCoO_2$, $LiFePO_4$, $Li_2MMn_3O_8$, wherein M is selected from Fe, Co, and combinations thereof,
   the sodium-containing cathode material is a sodium-containing, ion-conducting cathode material is selected from $Na_2V_2O_5$, $P_2$—$Na_{2/3}Fe_{1/2}Mn_{1/2}O_2$, $Na_3V_2(PO_4)_3$, $NaMn_{1/3}CO_{1/3}Ni_{1/3}PO_4$, and $Na_{2/3}Fe_{1/2}Mn_{1/2}O_2$@graphene composite, and
   the magnesium-containing cathode material is a magnesium-containing, ion-conducting cathode material and is a doped manganese oxide.

4. The solid-state, ion-conducting battery of claim 1, wherein the cathode material comprises a conducting carbon material, and the cathode material, optionally, further comprises an organic or gel ion-conducting electrolyte.

5. The solid-state, ion-conducting battery of claim 1, wherein the anode material is a lithium-containing anode material, a sodium-containing anode material, or a magnesium-containing anode material.

6. The solid-state, ion-conducting battery of claim 5, wherein
   the lithium-containing anode material is lithium metal,
   the sodium-containing anode material is sodium metal or an ion-conducting, sodium-containing anode material selected from $Na_2CsH_4O_4$ and $Na_{0.66}Li_{0.22}Ti_{0.78}O_2$, and
   the magnesium-containing anode material is magnesium metal.

7. The solid-state, ion-conducting battery of claim 1, wherein the SSE material is a lithium-containing SSE material, a sodium-containing SSE material, or a magnesium-containing SSE material.

8. The solid-state, ion-conducting battery of claim 7, wherein the lithium-containing SSE material is a Li-garnet SSE material.

9. The solid-state, ion-conducting battery of claim 8, wherein the Li-garnet SSE material is cation-doped $Li_5La3M^1{}_2O_{12}$, where $M^1$ is Nb, Zr, Ta, or combinations thereof, cation-doped $Li_6La_2BaTa_2O_{12}$, cation-doped $Li_7La_3Zf_2O_{12}$, and cation-doped $Li_6BaY_2M^1{}_2O_{12}$, where cation dopants are barium, yttrium, zinc, or combinations thereof.

10. The solid-state, ion-conducting battery of claim 8, wherein said Li-garnet SSE material is $Li_5La_3Nb_2O_{12}$, $Li_5La_3Ta_2O_{12}$, $Li_7La_3Zf_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zf_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zf_2O_{12}$, $Li_{6.75}BaLa_2Nb_{1.75}Zn_{0.25}SO_{12}$, or $Li_{6.75}BaLa_2Ta_{1.75}Zn_{0.25}O_{12}$.

11. The solid-state, ion-conducting battery of claim 1, wherein the ion-conducting cathode material, the ion-conducting anode material, the SSE material, and the current collector form a cell, and the solid-state, ion-conducting battery comprises a plurality of the cells, each adjacent pair of the cells is separated by a bipolar plate.

12. The solid-state, ion-conducting battery of claim 1, wherein the dense region is thinner than the porous region.

13. The solid-state, ion-conducting battery of claim 1, wherein the dense region is laminated in a green state onto the porous region followed by sintering.

14. The solid-state, ion-conducting battery of claim 1, wherein the dense region has a thickness of 1 to 50 microns.

15. The solid-state, ion-conducting battery of claim 1, wherein the porous region and the dense region each comprise a cast or pressed surface.

16. The solid-state, ion-conducting battery of claim 1, wherein the porous region and the dense region each comprise a tape-cast surface.

17. The solid-state, ion-conducting battery of claim 1, wherein the porous region on one side of the dense region is layered and is multi-layered wherein a first layer has a porosity different from a second layer.

18. The solid-state, ion-conducting battery of claim 1, wherein the cathode comprises a first material and an electronic-conducting material, wherein
the first material is selected from the group consisting of lithium-containing material, sodium-containing cathode material, magnesium-containing cathode material, and a polysulfide or an organic sulfide wherein
the lithium-containing material is selected from the group consisting of lithium nickel manganese cobalt oxides, lithium manganese oxides and lithium iron phosphates,
the sodium-containing material is selected from the group consisting of $Na_2V_2O_5$, $P_2$—$Na_{2/3}Fe_{1/2}Mn_{1/2}O_2$, $Na_3V_2(PO_4)_3$, $NaMn_{1/3}Co_{1/3}Ni_{1/3}PO_4$, and $Na_{2/3}Fe_{1/2}Mn_{1/2}O_{1/2}$@graphene composite, and
the magnesium-containing material is a doped manganese oxide, and
the electronic-conducting material is an electrically conducting carbon material.

19. The solid state ion-conducting battery of claim 18, wherein
the doped manganese oxide is $Mg_xMnO_2 \cdot yH_2O$,
the lithium nickel manganese cobalt oxides are selected from the group consisting of materials having the formula $LiNi_xMn_yCo_zO_2$, where $x+y+z=1$, $LiCoO_2$, $LiNi_{1/3}Co_{1/3}Mn_{1/3}O_2$, $LiNi_{0.5}Co_{0.2}Mn_{0.3}O_2$,
the lithium manganese oxides are selected from the group consisting of $LiMn_2O_4$ and $LiNi_{0.5}Mn_{1.5}O_4$,
the lithium iron phosphates are selected from the group consisting of $LiFePO_4$, $LiMnPO_4$, and $LiCoPO_4$, and $Li_2MMn_3O_8$, where M is selected from Fe and Co,
the polysulfide or organic sulfide are selected from the group consisting of copolymerized sulfur and carbyne polysulfide and
the electrically conducting carbon material is graphene or carbon black.

20. The solid-state, ion-conducting battery of claim 1, wherein
the anode material is a metallic form of an ion conducted in the SSE during operation of the solid-state, ion conducting battery, and the anode material at least partially fills at least one pore of the porous region,
wherein the metal is selected from the group consisting of lithium, sodium and magnesium, and
when the metal is lithium, the lithium conformally coats the at least one pore.

21. The solid-state, ion-conducting batter of claim 20, wherein the anode further comprises an electronic conducting phase selected from the group consisting of graphite, hard carbon, porous hollow carbon spheres and tubes, tin, tin alloy, tin/carbon, tin/cobalt alloy and silicon/carbon.

22. A solid-state, ion-conducting battery comprising a solid-state electrolyte (SSE) material comprising a porous region of sintered particles of electrolyte material disposed on a dense region of electrolyte material having a thickness of 1 to 100 microns that is too thin to be self-supporting, particles of the porous region are fused into the dense region, the SSE material configured such that ions diffuse into and out of the porous region of the SSE material during charging and/or discharging of the battery, wherein the dense region is supported by the porous region, and the porous region of the SSE material that has the cathode material disposed thereon has a dimension of 20 μm to 200 μm and/or the porous region of the SSE material that has the anode material disposed thereon has a dimension of 20 μm to 200 μm.

23. A solid-state, ion-conducting battery comprising:
a solid state electrolyte (SSE) comprising a dense region and a porous region, the SSE made by the method of laminating a porous layer precursor in the green state with a dense layer precursor in the green state to form a green laminate; sintering the green laminate to form a laminate having a dense region and a porous region; and
a cathode material or an anode material;
a current collector disposed on at least a portion of the cathode material or the anode material,
wherein the porous region has a plurality of pores, and the dense region has a thickness of 1 μm to 100 μm, wherein the cathode material or the anode material is disposed on at least a portion of the porous region, particles of the porous region are fused into the dense region and the dense region is free of the cathode material and the anode material.

24. The solid-state, ion-conducting battery of claim 23, wherein the porous layer precursor and the dense layer precursor are each made by a method independently selected from tape casting, calendaring, embossing, punching, laser-cutting, solvent bonding, lamination, heat lamination, extrusion, co-extrusion, centrifugal casting, slip casting, gel casting, die casting, pressing, isostatic pressing, uniaxial pressing, and sol gel processing.

25. The solid-state, ion-conducting battery of claim 23, wherein the porous layer precursor is tape cast and the dense layer precursor is tape cast.

* * * * *